(12) United States Patent
Takeda

(10) Patent No.: US 8,681,410 B2
(45) Date of Patent: Mar. 25, 2014

(54) OPTICAL SCANNER, IMAGE FORMING APPARATUS AND IMAGE DISPLAY APPARATUS

(75) Inventor: Hitoshi Takeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 420 days.

(21) Appl. No.: 12/837,830

(22) Filed: Jul. 16, 2010

(65) Prior Publication Data

US 2011/0019251 A1    Jan. 27, 2011

(30) Foreign Application Priority Data

Jul. 23, 2009    (JP) .................................. 2009-171867

(51) Int. Cl.
*G02B 26/08*    (2006.01)

(52) U.S. Cl.
USPC ..................................... 359/224.1; 359/224.2

(58) Field of Classification Search
USPC ....................... 359/224.1–224.2, 198.1, 221.2
See application file for complete search history.

(56) References Cited

U.S. PATENT DOCUMENTS

| | | | |
|---|---|---|---|
| 6,900,925 B2 | 5/2005 | Kato et al. | |
| 6,924,914 B2 | 8/2005 | Kato et al. | |
| 6,995,885 B2 | 2/2006 | Nakajima | |
| 7,014,115 B2 | 3/2006 | Fu | |
| 7,038,834 B2 | 5/2006 | Kato et al. | |
| 7,057,783 B2 | 6/2006 | Kato et al. | |
| 7,394,583 B2 | 7/2008 | Akedo et al. | |
| 7,453,617 B2 | 11/2008 | Yee et al. | |
| 7,529,011 B2 | 5/2009 | Fujii | |
| 2002/0118429 A1 | 8/2002 | Miyajima et al. | |
| 2003/0042561 A1 | 3/2003 | Funaki | |
| 2004/0188783 A1 | 9/2004 | Funaki | |
| 2005/0206987 A1 | 9/2005 | Miyajima et al. | |
| 2005/0231794 A1 | 10/2005 | Funaki | |

(Continued)

FOREIGN PATENT DOCUMENTS

| | | | |
|---|---|---|---|
| JP | 63-261319 | * | 10/1988 |
| JP | 63-261320 | | 10/1988 |

(Continued)

OTHER PUBLICATIONS

Notification of Reasons for Refusal dated Nov. 27, 2012 received from the Japanese Patent Office from related Japanese Application No. 2009-171867, together with an English-language translation.

*Primary Examiner* — James Phan
(74) *Attorney, Agent, or Firm* — Scully, Scott, Murphy & Presser, PC

(57) ABSTRACT

There is provided an optical scanner, and an image forming apparatus and an image display apparatus which have the optical scanner. The optical scanner includes a mirror portion having a base plate portion, and a reflective portion which is adhered to a surface of the base plate portion; and a torsion beam portion which is connected to the mirror portion, made of a same material as the base plate portion and integrally formed with the base plate portion, and which is configured to be torsionally vibrated. The reflective portion includes a reinforcement portion and a reflective surface. The reinforcement portion is made of material having a density lower than that of the base plate portion and a Young's modulus greater than that of the base plate portion. The reflective surface is formed on a surface of the reinforcement portion and is configured to reflect the incident light.

13 Claims, 14 Drawing Sheets

(56) References Cited

U.S. PATENT DOCUMENTS

| | | |
|---|---|---|
| 2006/0144948 A1 | 7/2006 | Fu |
| 2007/0188272 A1 | 8/2007 | Nakamura et al. |
| 2009/0034038 A1 | 2/2009 | Torashima et al. |

FOREIGN PATENT DOCUMENTS

| | | |
|---|---|---|
| JP | 7-50261 | 3/1995 |
| JP | 8-220463 | 8/1996 |
| JP | 2001-249300 | 9/2001 |
| JP | 2001-264672 | 9/2001 |
| JP | A-2002-182136 | 6/2002 |
| JP | A-2003-071798 | 3/2003 |
| JP | 2003-131161 | 5/2003 |
| JP | 2004-37886 | 2/2004 |
| JP | 2004-37987 | 2/2004 |
| JP | 2004-85869 | 3/2004 |
| JP | 2004-325578 | 11/2004 |
| JP | 2005-24721 | 1/2005 |
| JP | 2005-24722 | 1/2005 |
| JP | 2005-70791 | 3/2005 |
| JP | 2005-99638 | 4/2005 |
| JP | 2005-181430 | 7/2005 |
| JP | 2005-300927 | 10/2005 |
| JP | 2005-308863 | 11/2005 |
| JP | 2006-64901 | 3/2006 |
| JP | 2006-79078 | 3/2006 |
| JP | A-2006-061489 | 3/2006 |
| JP | A-2006-071678 | 3/2006 |
| JP | 2006-293116 | 10/2006 |
| JP | 2009-31642 | 2/2009 |
| JP | A-2010-54651 | 3/2010 |
| WO | WO 2006/075717 | 7/2006 |

* cited by examiner

US 8,681,410 B2

OPTICAL SCANNER, IMAGE FORMING APPARATUS AND IMAGE DISPLAY APPARATUS

CROSS-REFERENCE TO RELATED APPLICATION

This application claims priority from Japanese Patent Application No. 2009-171867, filed on Jul. 23, 2009, the entire subject matter of which is incorporated herein by reference.

TECHNICAL FIELD

Aspects of the present invention relate to an optical scanner, an image forming apparatus and an image display apparatus including the optical scanner.

BACKGROUND ART

An optical scanner using a Micro-Electro-Mechanical Systems (MEMS) mirror has been used in a laser printer, a projection type display apparatus and the like. FIG. 9 shows a related-art optical scanner 100. The related-art optical scanner includes a base plate 110, a driving portion 111 that is formed on the base plate 110, a pair of torsion beam portions 112 that are connected to the base plate 110 and a mirror portion 113 that is supported by the pair of torsion beam portions 112 and has a reflective surface configured to reflect incident light. The driving portion 111 has a piezoelectric element. When a voltage is applied to the driving portion 111, the piezoelectric element of the driving portion 111 causes bending deformation in a portion of the base plate 110 in proximity to the driving portion 111. The bending deformation caused in the base plate 110 generates a plate wave on the base plate 110. The plate wave generated on the base plate 110 produces a rotational moment in the mirror portion 113 supported by the torsion beam portions 112 and the torsion beam portions 112. The rotational moment causes the mirror portion 113 and the torsion beam portions 112 to be torsionally vibrated. As the mirror portion 113 and the torsion beam portions 112 are torsionally vibrated, the mirror portion 113 is oscillated. As the mirror portion 113 is oscillated, the light incident on the reflective surface of the mirror portion 113 is scanned.

However, in order to achieve a large optical deflection angle, it is required to torsionally vibrate the mirror portion 113 largely. When the mirror portion 113 is largely oscillated, dynamic distortion of the mirror portion 113 becomes large. As a result, it becomes difficult to perform a high precision scanning.

SUMMARY

Accordingly, it is an aspect of the present invention to provide an optical scanner capable of reducing dynamic distortion of a mirror portion to perform a high precision scanning, an image forming apparatus and an image display apparatus including the optical scanner.

According to an illustrative embodiment of the present invention, there is provided an optical scanner comprising: a mirror portion including a base plate portion, and a reflective portion which is adhered to a first surface which is one of a front surface and a back surface of the base plate portion, and which is configured to reflect an incident light; and a torsion beam portion which is connected to the mirror portion, made of a same material as the base plate portion and integrally formed with the base plate portion, and which is configured to be torsionally vibrated. The reflective portion includes a reinforcement portion and a reflective surface. The reinforcement portion is made of material having a density $\rho 2$ lower than a density $\rho 1$ of the base plate portion and a Young's modulus E2 greater than a Young's modulus E1 of the base plate portion. The reflective surface is formed on a second surface which is one of a front surface and a back surface of the reinforcement portion, and is configured to reflect the incident light.

According to another illustrative embodiment of the present invention, there is provided an image forming apparatus comprising: the above optical scanner; a light source which is configured to emit light to the optical scanner; and an image forming portion which is configured to form an image based on a light scanned by the optical scanner.

According to a further illustrative embodiment of the present invention, there is provided an image display apparatus comprising: the above optical scanner; a light source which is configured to emit light to the optical scanner; and an optical system which is configured to guide a light scanned by the optical scanner to an eye of a user.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 4B is a flow chart showing a process of providing piezoelectric elements 11L, 11R on an oscillation plate 4a;

DETAILED DESCRIPTION

[Outer Configuration of Optical Scanner]

Hereinafter, an illustrative embodiment of the present invention will be described with reference to the drawings. A driving controller 30 shown in FIG. 1 and FIG. 2 may be provided at any position. Accordingly, position of the driving controller 30 in FIG. 1 and FIG. 2 do not strictly correspond to each other.

Figure 1:
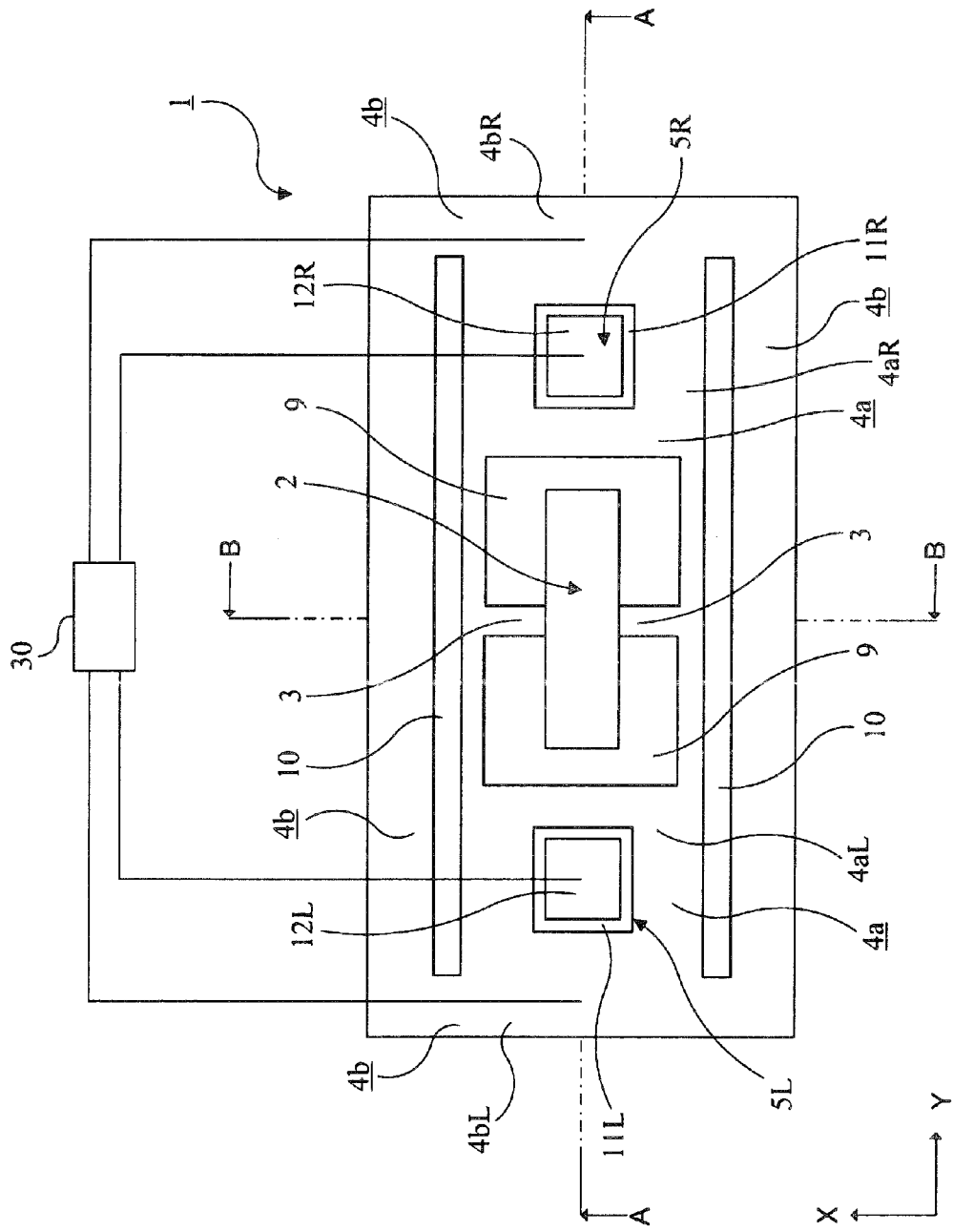
FIG. 1 is a plan view showing an outer configuration of an optical scanner 1 according to an illustrative embodiment of the present invention.

As shown in FIG. 1, an optical scanner 1 includes a mirror portion 2, torsion beam portions 3, an oscillation plate 4a, a fixing frame 4b and driving portions 5L, 5R. The mirror portion 2, the torsion beam portions 3, the oscillation plate 4a, the fixing frame 4b and the driving portions 5L, 5R are mounted on a base 20 shown in FIG. 2 and FIG. 3. A line B-B shown in FIG. 1 approximately coincide with an oscillation axis line AX2 of the mirror portion 2 shown in FIG. 3. The mirror portion 2 is rotationally oscillated about the oscillation axis line AX2.

Figure 2:
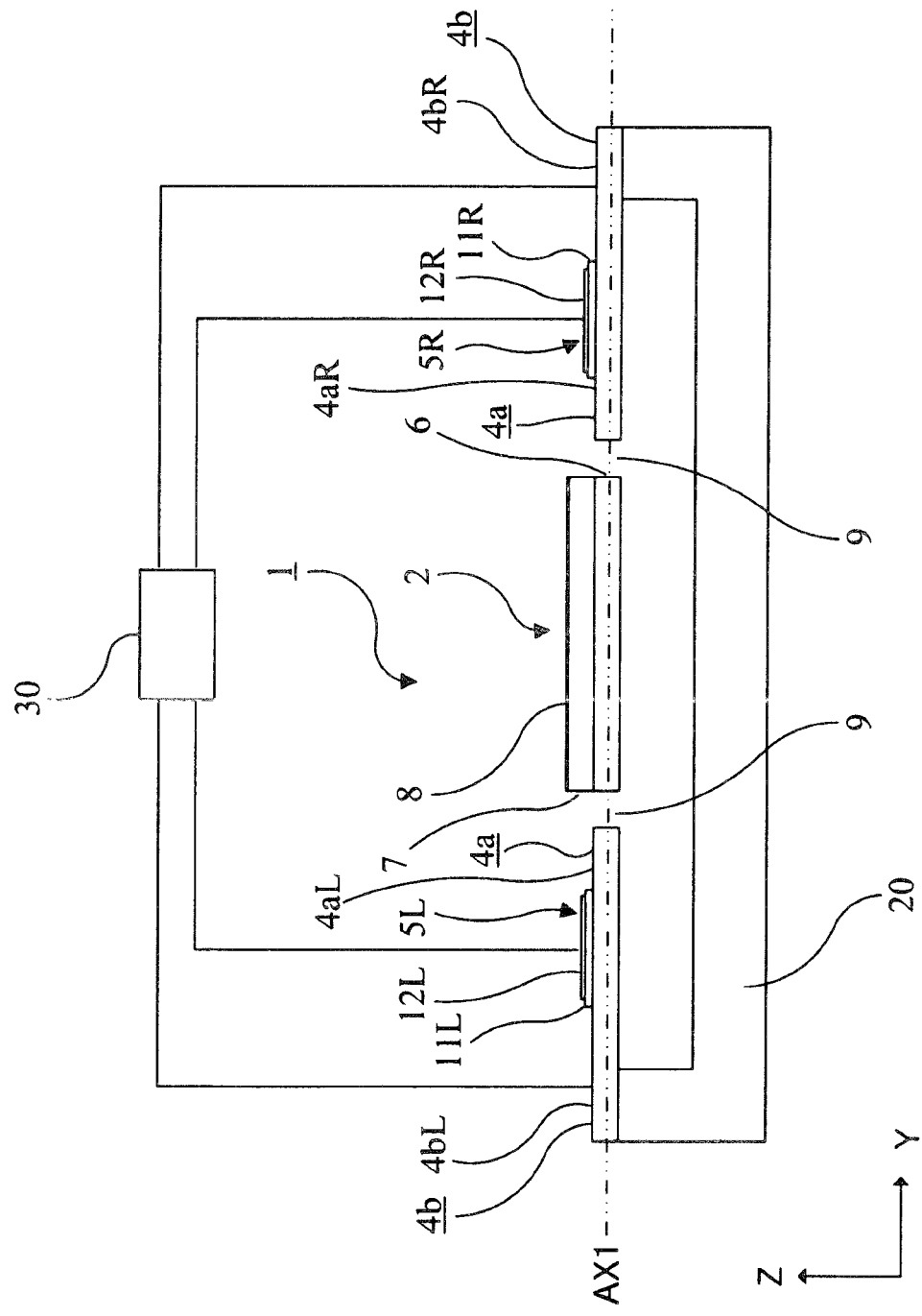
FIG. 2 is a sectional view taken along a line A-A of the optical scanner 1.
Figure 3:
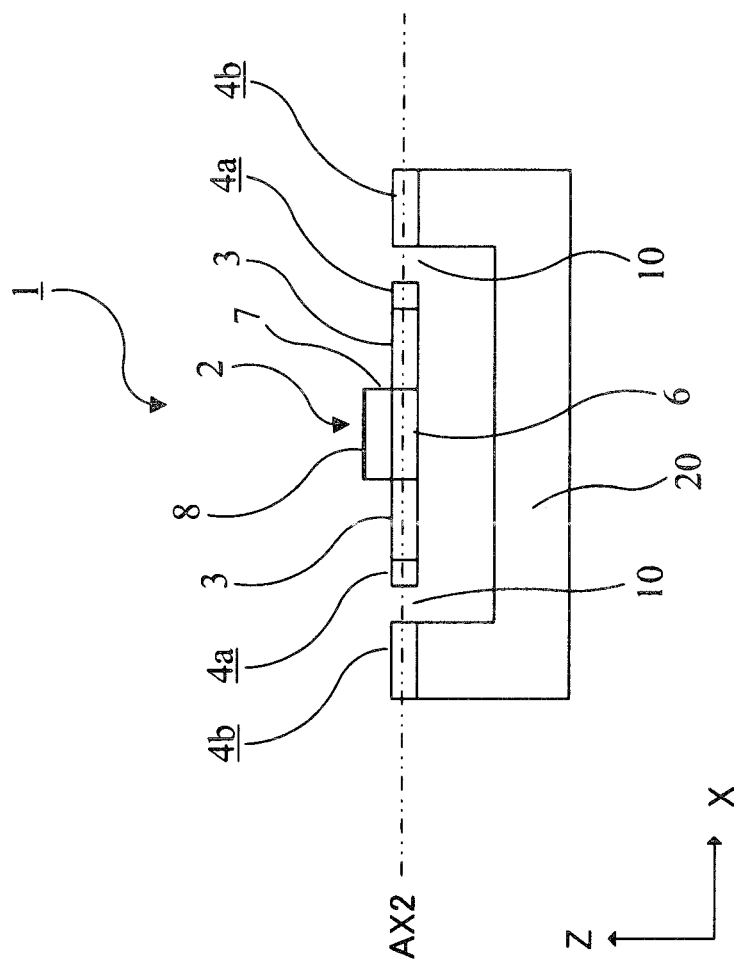
FIG. 3 is a sectional view taken along a line B-B of the optical scanner 1.

As shown in FIG. 2 and FIG. 3, the mirror portion 2 has a base plate portion 6, a reinforcement portion 7 and a reflective surface 8. The torsion beam portions 3 are connected to both sides of the base plate portion 6, respectively, and connected to the oscillation plate 4a. Hereinafter, a direction parallel to the torsion beam portions 3 shown in FIG. 1 is defined as an X-axis direction, a direction on a plane parallel to the reflective surface 8 and perpendicular to the torsion beam portions 3 is defined as a Y-axis direction, and a direction perpendicular to the reflective surface 8 is defined as a Z-axis direction. The same definitions of X-axis, Y-axis and Z-axis directions are given in the other drawings.

The torsion beam portions 3, the oscillation plate 4a, the fixing frame 4b and the base plate portion 6 are made of elastic and conductive stainless steel. The oscillation plate 4a includes an oscillation plate 4aL and an oscillation plate 4aR that are arranged in the Y-axis direction, as shown in FIG. 1 and FIG. 2. The fixing frame 4b is an outer frame surrounding the mirror portion 2, the torsion beam portions 3 and the oscillation plate 4a, as shown in FIG. 1. The fixing frame 4b has a fixing frame 4bL and a fixing frame 4bR that are arranged in the Y-axis direction, as shown in FIG. 1 and FIG. 2. The oscillation plate 4a has a pair of through-holes 9, as shown in FIG. 1. The optical scanner 1 has a pair of through-holes 10 between the oscillation plate 4a and the fixing frame 4b, respectively. The through-holes 9 and 10 are formed by an etching process to be described later. A base plate, including the torsion beam portions 3, the oscillation plate 4a, the fixing frame 4b and the base plate portion 6, is etched by an etching process and the base plate is penetrated in the Z-axis direction as shown in FIG. 2 and FIG. 3. The through-holes 9 have a rectangular shape on the X-Y plane, respectively, as shown in FIG. 1. The through-holes 10 have an elongated shape extending in the Y-axis direction on the X-Y plane, respectively, as shown in FIG. 1.

The pair of driving portions 5L, 5R have piezoelectric elements 11L, 11R and upper electrodes 12L, 12R. The driving portions 5L, 5R are provided at both sides of the oscillation plate 4a in the Y-axis direction. The mirror portion 2 is positioned between the driving portions 5L and 5R. The driving controller 30 is connected to the upper electrodes 12L, 12R and the fixing frames 4bL, 4bR of the optical scanner 1, as shown in FIG. 1 and FIG. 2. The driving controller 30 applies a driving voltage between the fixing frame 4bL and the upper electrode 12L, and also applies a driving voltage between the fixing frame 4bR and the upper electrode 12R. By applying the driving voltage, the piezoelectric elements 12L, 12R are displaced in a direction along a displacement axis AX1 parallel to the Y-axis direction. The displacement of the piezoelectric elements 12L, 12R causes the optical scanner 1 to oscillate the mirror portion 2.

[Method of Manufacturing Optical Scanner]

In the followings, a method of manufacturing the optical scanner 1 according to the illustrative embodiment will be described with reference to the drawings.

Figure 4A:
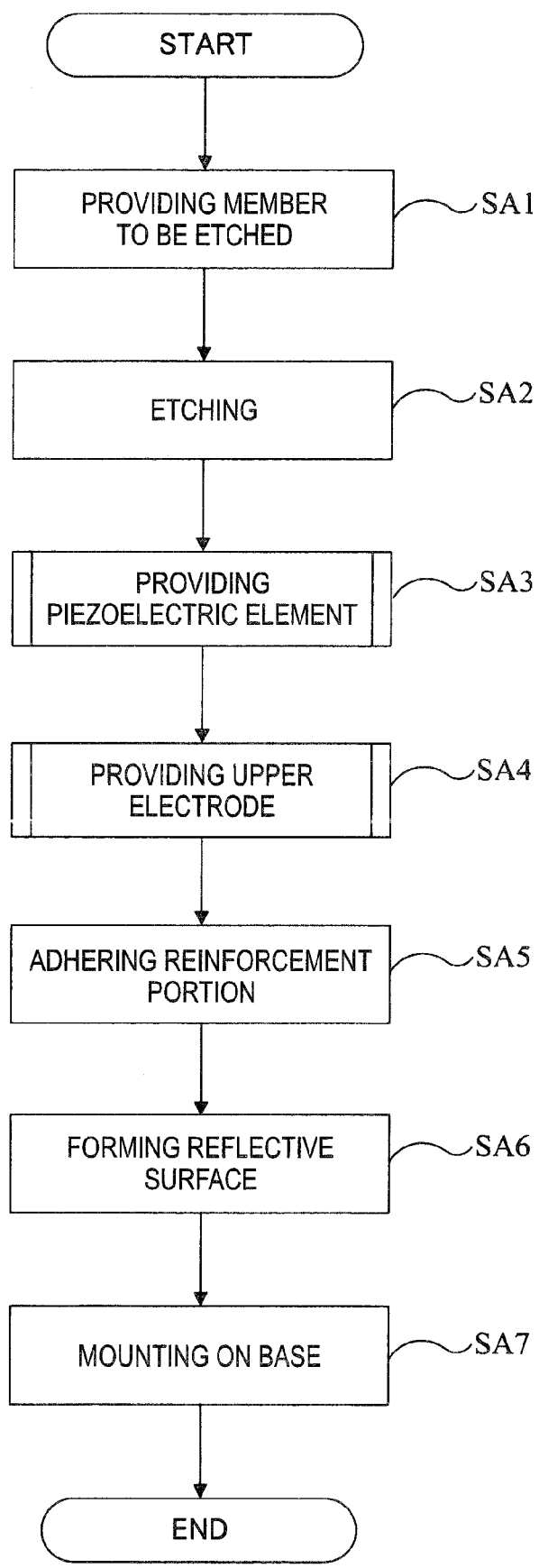
FIG. 4A is a flow chart showing a process of manufacturing the optical scanner 1.

First, as shown in FIG. 4A, a base plate made of elastic and conductive stainless steel is provided as a member to be etched (step SA1, hereinafter referred to as SA1). Then, an etching process is performed on the member, so that the torsion beam portions 3, the oscillation plate 4a, the fixing frame 4b and the base plate portion 6 are integrally formed (SA2).

Figure 4B:
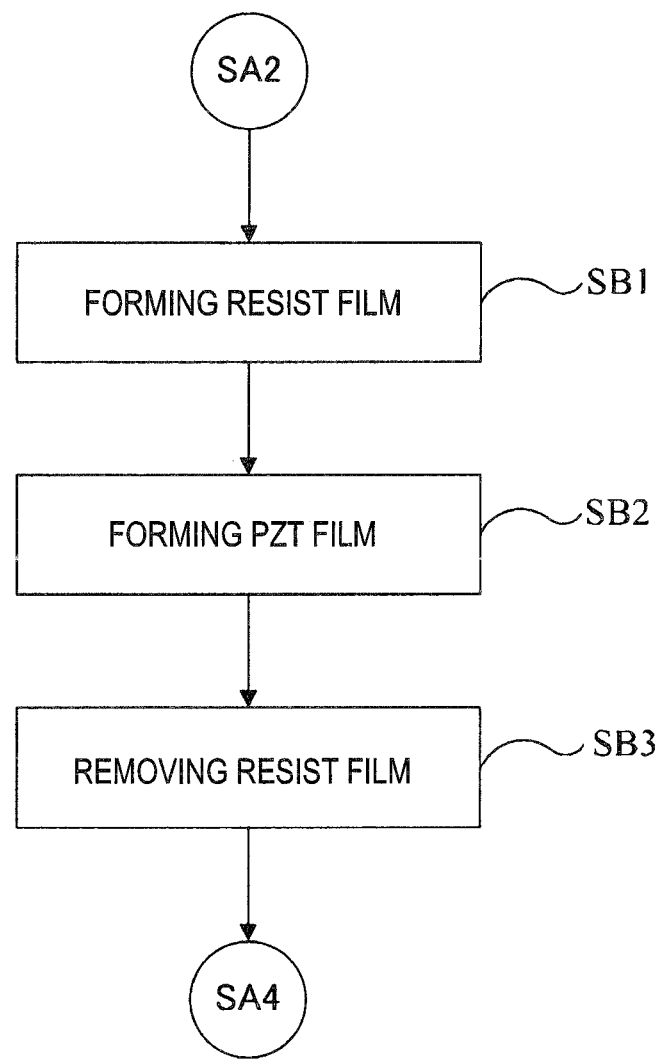

After the torsion beam portions 3, the oscillation plate 4a, the fixing frame 4b and the base plate portion 6 are integrally formed, a pair of piezoelectric elements 11L, 11R is provided at both sides of the Y-axis direction on the oscillation plate 4a (SA3). In the process of SA3, a resist film is formed on a surface of the oscillation plate 4a, except a region in which the piezoelectric elements 11L, 11R are provided, as shown in FIG. 4B (SB1). After the resist film is formed, aerosol of piezoelectric zirconate titanate (PZT) is sprayed on the part of the oscillation plate 4a having the resist film formed on the surface thereof (SB2). Through the process of SB2, a piezoelectric film of PZT is formed on the parts of the surface of the oscillation plate 4a, to which the piezoelectric elements 11L, 11R are to be provided. Accordingly, the piezoelectric elements 11L, 11R are formed. After the piezoelectric elements 11L, 11R are formed, the resist film is removed from the surface of the oscillation plate 4a (SB3).

Figure 4C:
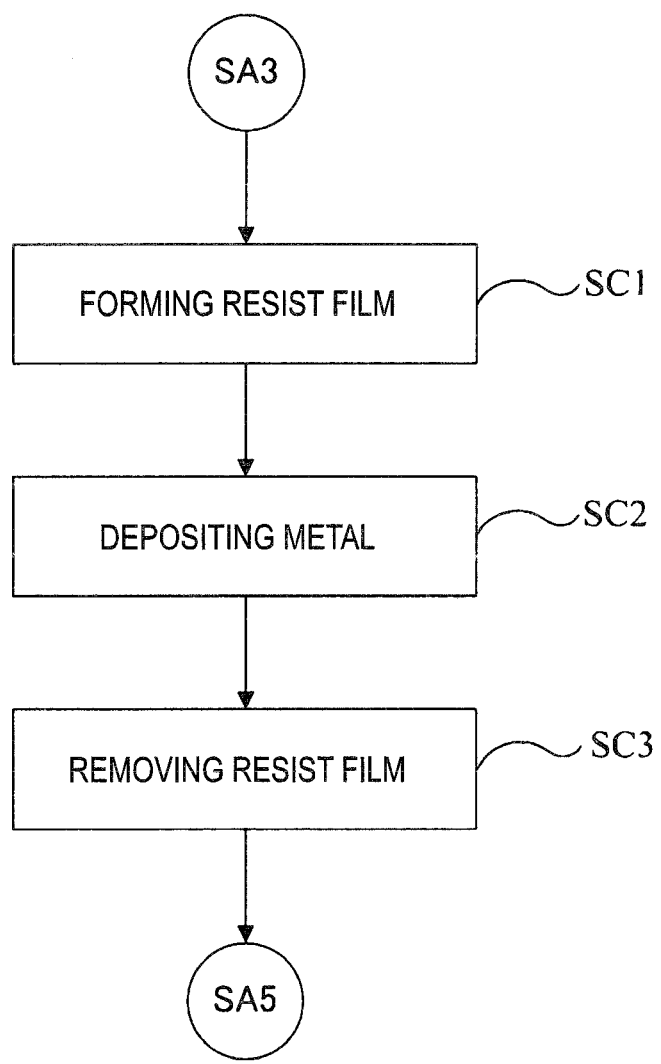
FIG. 4C is a flow chart showing a process of providing upper electrodes 12L, 12R on the piezoelectric elements 11L, 11R, respectively.

After the process of SA3 shown in FIG. 4A, a pair of upper electrodes 12L, 12R is provided on the piezoelectric elements 11L, 11R, respectively (SA4). In the process of SA4, a resist film is formed on a surface of the oscillation plate 4a, except a region in which the upper electrodes 12L, 12R are provided, as shown in FIG. 4C (SC1). When the resist film is formed, metal such as platinum (Pt), gold (Au) and the like is deposited on the part of the oscillation plate 4a having the resist film formed on the surface thereof (SC2). Through the process of SC2, the metal is deposited on the parts of the surface of the oscillation plate 4a, to which the upper electrodes 12L, 12R are to be provided. After the upper electrodes 12L, 12R are deposited, the resist film is removed from the surface of the oscillation plate 4a (SC3).

After the process of SA4 shown in FIG. 4A, a reinforcement portion 7 made of a material having a greater Young's modulus and a lower density than the base plate portion 6 is adhered to the base plate portion 6 (SA5). An example of such a material may be a sapphire. As an adhesive, LOCTITE 392+7923 (Henkel Japan Ltd.) is used, for example. After the reinforcement portion 7 is adhered to the base plate portion 6, a reflective surface 8 made of a metal film such as aluminum (Al), gold (Au) and the like is formed on the reinforcement portion 7 by the same method as that shown in FIG. 4C (SA6). When the reflective surface 8 is formed, the mirror portion 2, the torsion beam portions 3, the oscillation plate 4a, the fixing frame 4b and the driving portions 5L, 5R are mounted on the base 20 shown in FIG. 2 and FIG. 3 (SA7). Accordingly, the optical scanner 1 is manufactured.

[Operations of Optical Scanner]

Operations of the optical scanner 1 will be described with reference to the drawings.

As shown in FIG. 1 and FIG. 2, the driving controller 30 is connected to the fixing frames 4bL, 4bR and the upper electrodes 12L, 12R. The driving controller 30 supplies a driving signal with the fixing frame 4bL and the upper electrode 12L, and also supplies a driving signal with the fixing frame 4bR and the upper electrode 12R. Each of the driving signals is a signal that changes periodically in voltage with time. The driving signal supplied to the fixing frame 4bL and the upper electrode 12L has a reverse phase with respect to the phase of the driving signal supplied to the fixing frame 4bR and the upper electrode 12R. As the driving signal is supplied, a periodically changing driving voltage is applied between the fixing frame 4bL and the upper electrode 12L, and also applied between the fixing frame 4bR and the upper electrode 12R. The driving signal of reverse phase causes the piezoelectric elements 12L, 12R to be displaced in the same direction as the displacement axis AX1. In other words, when the piezoelectric element 12L is elongated in a plus direction of the Y-axis, the piezoelectric element 12R is shrunk in a plus direction of the Y-axis. When the piezoelectric element 12L is shrunk in a minus direction of the Y-axis, the piezoelectric element 12R is elongated in a minus direction of the Y-axis. As the piezoelectric elements 12L, 12R are displaced in the same direction as the displacement axis AX1, the oscillation plates 4aL, 4aR are bent in opposite directions in the Z-axis. In other words, when the oscillation plate 4aL is bent in a plus direction of the Z-axis, the oscillation plate 4aR is bent in a minus direction of the Z-axis. When the oscillation plate 4aL is bent in a minus direction of the Z-axis, the oscillation plate 4aR is bent in a plus direction of the Z-axis. Accordingly, the oscillation plates 4aL, 4aR are periodically bent and a standing wave having the oscillation axis AX2 as a node is generated on the oscillation plate 4a.

The standing wave, which is generated on the oscillation plate 4a, induces a torsion oscillation around the oscillation axis AX2 of the torsion beam portions 3. In addition, the mirror portion 2 is oscillated around the oscillation axis AX2. As the mirror portion 2 is oscillated, the reflective surface 8 of the mirror portion 2 is oscillated around the oscillation axis AX2 to reflect an incident light. Accordingly, the optical scanner 1 reflects and scans the light incident on the reflective surface 8.

[Dynamic Distortion]

Figure 5:
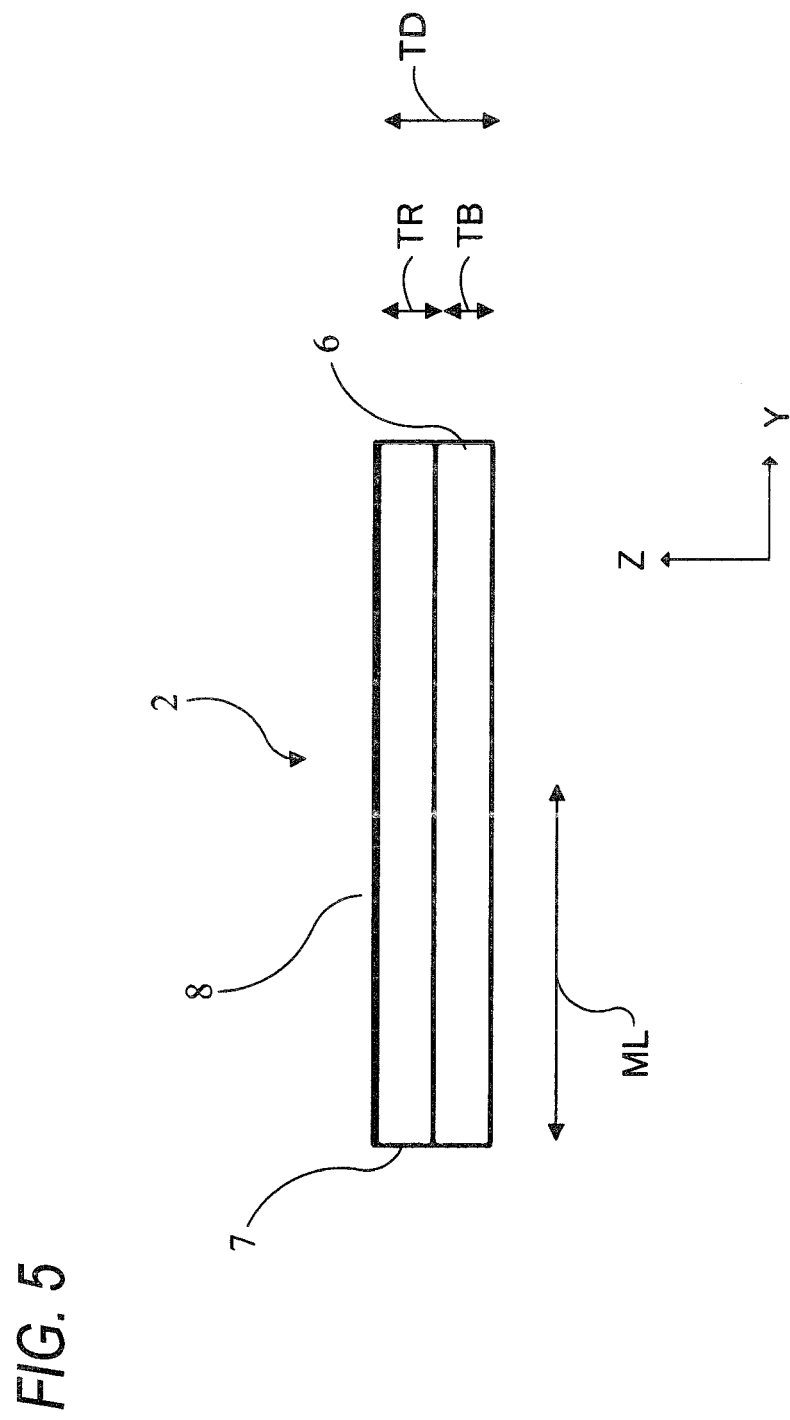
FIG. 5 is a side view showing a mirror portion 2 of the optical scanner 1.

With tables and drawings, an analysis result obtained by a simulation about dynamic distortion generated on the reflective surface 8 of the mirror portion 2 will be described. In general, dynamic distortion DD of an oscillation member is defined by the following Equation 1 which has a proportional constant Ct, a resonance frequency ω when the oscillation member is oscillated, an optical deflection angle θ, a distance ML between an end and a center of the oscillation member in a stationary state, a thickness TD of the oscillation member, a density ρ of the oscillation member and a Young's modulus E. In this illustrative embodiment, the mirror portion 2 corresponds to the oscillation member. Meanwhile, as shown in the Equation 1, the dynamic distortion DD varies depending on the resonance frequency ω and the optical deflection angle θ. According to a material used for the reinforcement portion 7, or a thickness of the reinforcement portion 7, the resonance frequency ω and the optical deflection angle θ change. Like this analysis, when a material used for the reinforcement portion 7, or a thickness of the reinforcement portion 7 is changed and analysis results in respective case are compared, it is necessary to perform the comparison while the resonance frequency ω and the optical deflection angle θ are left under same conditions. In view of this, the following analysis results show the dynamic distortion DD when the resonance frequency ω was set to be 3216 Hz and the optical deflection angle θ was set to be 34°. Additionally, in the simulation, only the mirror portion 2 shown in FIG. 5 was modeled and oscillated and the entire optical scanner 1 as shown in FIG. 1 was not modeled and oscillated. However, the dynamic distortion DD depends only on the dimension and physical properties of the mirror portion 2, the resonance frequency ω when the mirror portion is oscillated and the optical deflection angle θ, as indicated by the Equation 1. Accordingly, even if the entire optical scanner shown in FIG. 1 and the like is modeled and the simulation is performed for the model, the same result as the analysis result obtained this time would be obtained. In addition, same result would be obtained for an actual measurement. Table 1 shows densities ρ and Young's modulus E of materials of the base plate portion 6 and the reinforcement portion 7, which were used in the simulation.

$$DD = Ct \cdot \omega^2 \theta \cdot (ML^5/TD^2) \cdot (\rho/E) \qquad \text{[Equation 1]}$$

TABLE 1

|  | Stainless steel | Alumina | Sapphire | Silicon carbide | Diamond |
|---|---|---|---|---|---|
| ρ (g/cm³) | 8 | 4 | 3.97 | 3.14 | 3.52 |
| E (GPa) | 190 | 410 | 470 | 430 | 1000 |
| ρ/E (s²m⁻²) | 4.210E−08 | 0.976E−08 | 0.845E−08 | 0.730E−08 | 0.352E−08 |

Table 2 shows analysis results about the dynamic distortion DD generated on the reflective surface 8 when stainless steel having a thickness TB of 100 μm was used for the base plate portion 6 and one of alumina, sapphire, silicon carbide and diamond having a thickness TR of 100 μm was used for the reinforcement portion 7. Meanwhile, in the simulation, the analysis was performed on the assumption that the reflective surface 8 was not formed on the reinforcement portion 7. Accordingly, to be more precise, the dynamic distortion DD generated on the reflective surface 8 (described later) was dynamic distortion generated on the surface of the reinforcement portion 7. However, since the reflective surface 8 is a thin film of metal, the distortion of the reflective surface 8, which is formed on the surface of the reinforcement portion 7, would approximately same as the distortion generated on the surface of the reinforcement portion 7. Thus, hereinafter, the dynamic distortion generated on the surface of the reinforcement portion 7 is described as "dynamic distortion DD generated on the reflective surface 8."

TABLE 2

|  | No | Alumina | Sapphire | Silicon carbide | Diamond |
|---|---|---|---|---|---|
| Dynamic distortion DD (μm) | 4.14 | 0.564 | 0.531 | 0.513 | 0.374 |

As shown in Table 2, the dynamic distortion DD of the reflective surface for the conventional optical scanner in which the reinforcement portion 7 is not adhered to the base plate portion 6 is about 4.14 μm. Whereas, the dynamic distortion DD of the reflective surface for the optical scanner 1 in which the reinforcement portion 7 made of any one of alumina, sapphire, silicon carbide and diamond is adhered to the base plate portion 6 is about 0.3 μm to 0.6 μm. Accordingly, it can be seen that, compared to the case where the reflective surface 8 is directly formed on the base plate portion 6 of stainless steel, in the case where the reinforcement portion 7 made of any one of alumina, sapphire, silicon carbide and diamond is adhered to the base plate portion 6 and the reflective surface 8 is formed on the surface of the reinforcement portion 7, the dynamic distortion DD of the reflective surface is decreased by about 90%. Any of alumina, sapphire, silicon carbide and diamond has a Young's modulus greater than that of stainless steel. The greater a Young's modulus of any material, the more unlikely a surface of the material is distorted. Thus, it can be seen that in a case where the reinforcement portion 7 having a Young's modulus greater than that of the base plate portion 6 is adhered to the base plate portion 6 and the reflective surface 8 is formed on the surface of the reinforcement portion 7, the dynamic distortion DD of the reflective surface 8 is decreased, compared to the case where the reflective surface 8 is directly formed on the base plate portion 6.

Figure 6:
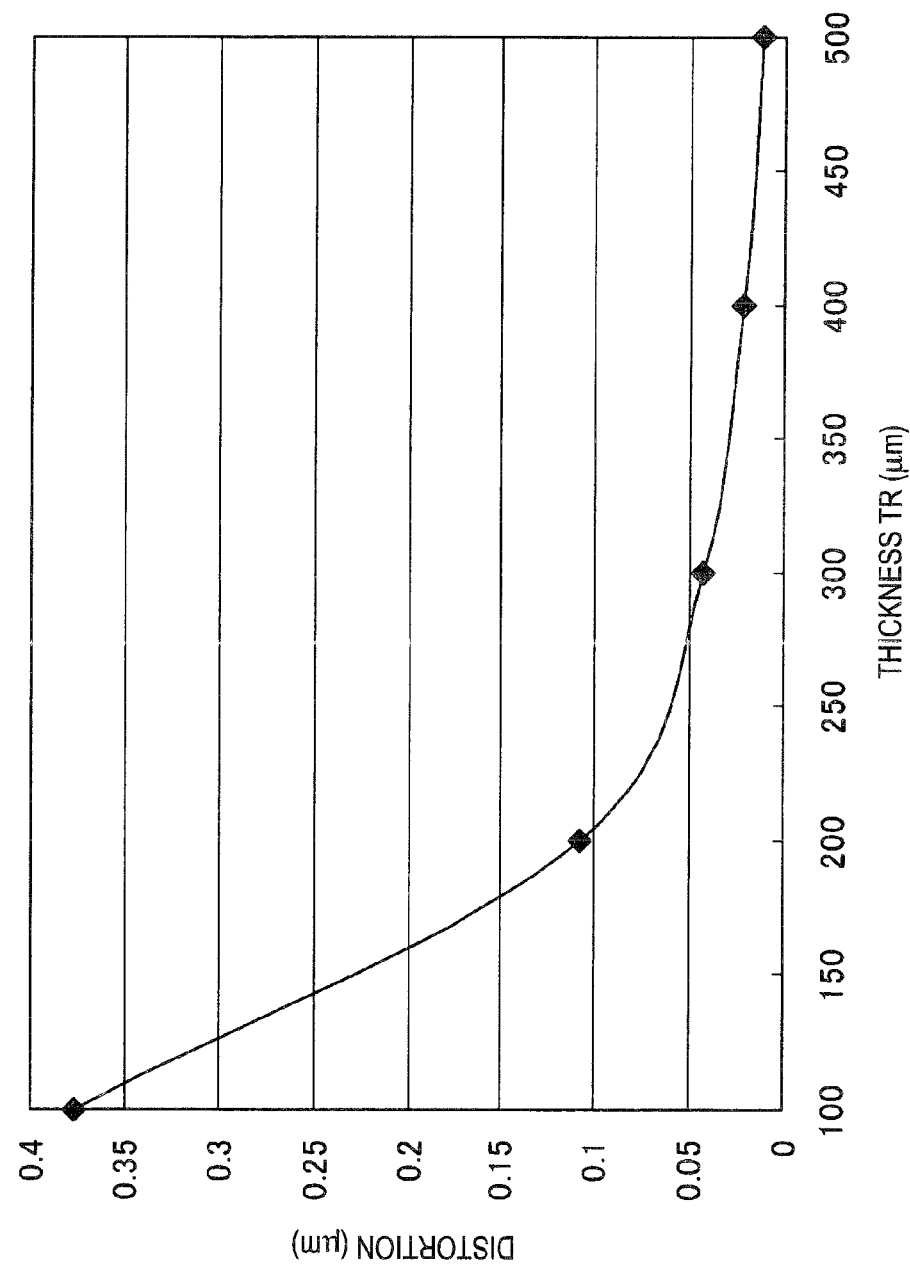
FIG. 6 is a view showing a relation between a thickness TR of a reinforcement portion 7 of the optical scanner 1 and dynamic distortion DD generated on a reflective surface 8.

Table 3 and FIG. 6 show analysis results about the dynamic distortion DD generated on the reflective surface 8 when the base plate portion 6 is made of stainless steel material having a thickness TB of 100 μm and the reinforcement portion 7 is made of sapphire having a thickness TR of 100 μm, 200 μm, 300 μm, 400 μm or 500 μm.

TABLE 3

| Thickness (μm) | Dynamic distortion (μm) |
| --- | --- |
| 100 | 0.531 |
| 200 | 0.202 |
| 300 | 0.103 |
| 400 | 0.0639 |
| 500 | 0.0439 |

As shown in Table 3 and FIG. 6, the greater the thickness TR of the reinforcement portion 7 is, the smaller the dynamic distortion DD of the reflective surface 8 becomes. In other words, it can be seen that as the reflective surface 8 is farther away from the base plate portion 6 in the Z-axis direction, the dynamic distortion DD generated on the reflective surface 8 is decreased. However, as shown in FIG. 6, although the greater thickness TR of the reinforcement portion 7 causes the dynamic distortion DD of the reflective surface 8 to be smaller, the dynamic distortion DD converges around the thickness TR of 500 μm. Accordingly, in order to decrease the dynamic distortion DD of the reflective surface 8 of the mirror portion 2 without enlarging the mirror portion 2, it is advantageous that the thickness TR of the reinforcement portion 7 is five times or less greater than the thickness TB of the base plate portion 6.

[Static Distortion]

Figure 7:
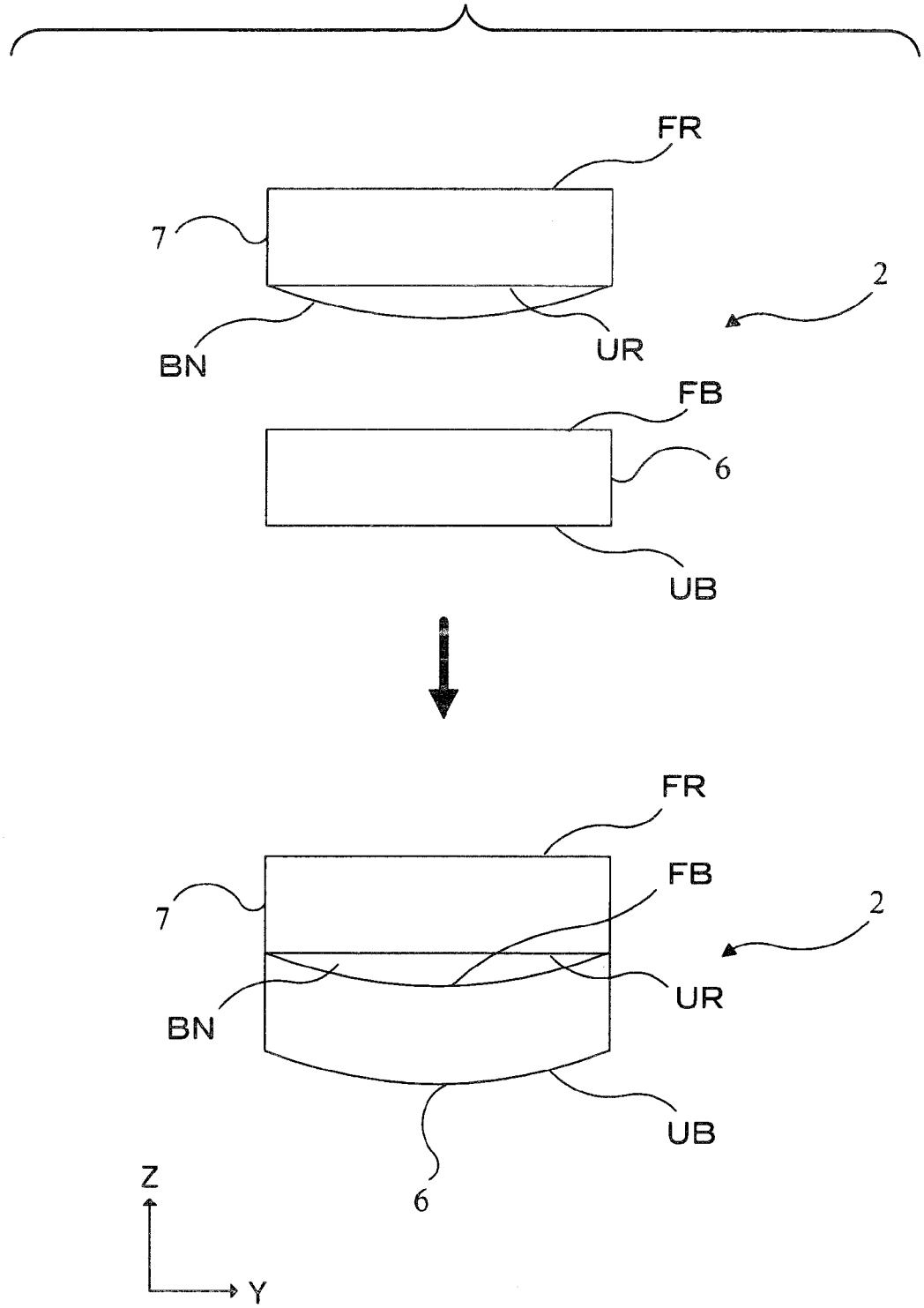
FIG. 7 is a view showing static distortion that is generated on a base plate portion 6 when adhering the base plate portion 6 and the reinforcement portion 7.

A test result about static distortion generated on the reflective surface 8 of the mirror portion 2 will be described with reference to Table 4 and FIG. 7. In FIG. 7, front and back of the base plate portion 6 and the reinforcement portion 7 indicate "a plus side of Z-axis" and "a minus side of Z-axis" of the base plate portion 6 and the reinforcement portion 7, respectively. In SA5 shown in FIG. 4A, when an adhesive BN is applied to a back surface UR of the reinforcement portion 7 having a Young's modulus greater than that of the base plate portion 6 and the back surface UR of the reinforcement portion 7 is adhered to a front surface FB of the base plate portion 6, static distortion is generated on a back surface UB of the base plate portion 6, as shown in FIG. 7. The reason why the static distortion is generated on the back surface UB of the base plate portion 6 is that when the adhesive BN is solidified, the front surface FB of the base plate portion 6 is pressed by the reinforcement portion 7 having a Young's modulus greater than that of the base plate portion 6 and by the adhesive BN and is thus deformed.

Table 4 shows changes in distortions of the back surface UB of the base plate portion 6 and the front surface FR of the reinforcement portion 7 when the base plate portion 6 made of stainless steel and the reinforcement portion 7 made of sapphire are adhered to each other. As the adhesive, LOCTITE 392+7923 (Henkel Japan Ltd.) was used. The static distortion was measured by the WYKO surface profiler NT-3300 (Veeco Instruments, Inc.). The distortions of the back surface UB of the base plate portion 6 and the front surface FR of the reinforcement portion 7 before the adhesion mean the original static distortions that are present on the back surface UB of the base plate portion 6 and the front surface FR of the reinforcement portion 7 before the adhesion, respectively. As shown in Table 4, while the back surface UB of the base plate portion 6 was distorted by 540 nm after the adhesion, the front surface FR of the reinforcement portion 7 was distorted only by 35 nm. Accordingly, compared to the case where the reflective surface 8 is formed on the back surface UB of the base plate portion 6, in the case where the reflective surface 8 is formed on the front surface FR of the reinforcement portion 7, it is possible to suppress the static distortion generated on the reflective surface 8 in adhering to be smaller.

TABLE 4

| | UB distortion (nm) | FR distortion (nm) |
| --- | --- | --- |
| Before adhesion | 1036 | 146 |
| After adhesion | 1576 | 181 |

In the meantime, since the base plate portion 6 is integrally formed with the torsion beam portions 3, the front surface FB and the back surface UB of the base plate portion 6 may be locally distorted at the connection parts between the base plate portion 6 and the torsion beam portions 3 when the mirror portion 2 is oscillated. Accordingly, when the reflective surface 8 is formed on the back surface UB of the base plate portion 6, local dynamic distortion is generated on the reflective surface 8 at the connection parts between the base plate portion 6 and the torsion beam portions 3. However, in the optical scanner 1 of this illustrative embodiment, since the reflective surface 8 is formed on the front surface FR of the reinforcement portion 7, the local dynamic distortion is not generated. When the dynamic distortion is locally generated on the reflective surface 8, it is not possible to perform a high precision scanning if the reflective surface 8 reflects the light on the part in which the local dynamic distortion is generated. Accordingly, since it is necessary to avoid this part from using as a scanning region of the reflective surface 8, the scanning region of the reflective surface 8 is narrowed. However, according to the optical scanner 1 of this illustrative embodiment, since the reflective surface 8 is formed on the front surface FR of the reinforcement portion 7, the local dynamic distortion is not generated. Therefore, the optical scanner 1 can secure the scanning region of the reflective surface 8 as large as possible while performing a high precision scanning.

In this illustrative embodiment, the reflective surface 8 is formed by the film of metal. The metal may be aluminum, silver or gold having a great reflectivity. In the meantime, silver causes a chemical reaction with air or transport phenomenon. Thus, when silver is used for the reflective surface 8, it may be preferable to coat an anti-oxidizing film on the surface of the reflective surface 8.

In this illustrative embodiment, the base plate portion 6 is made of metal such as stainless steel and the reinforcement portion 7 is made of the material such as sapphire, alumina, silicon carbide and diamond, having a Young's modulus greater than that of the stainless steel. While the metal such as stainless steel has a high elastic limit, the material such as sapphire has a low elastic limit. Therefore, if the material such as sapphire were used in the base plate portion 6 as well as the reinforcement portion 7, when the torsion beam portions 3 are torsionally vibrated and the mirror portion 2 is oscillated, a damage would be caused at the connections between the base plate portion 6 made of the material such as sapphire and the torsion beam portions 3 integrally formed with the base plate portion 6. Accordingly, it is not preferable to use the material such as sapphire in the base plate portion 6 as well as the reinforcement portion 7. Further, it may be conceivable to adopt a structure in which the material such as sapphire is used in the base plate portion 6 as well as the reinforcement portion 7, the torsion beam portions 3 are used as a rotation axis, a motor is attached to an end of the torsion beam portions 3 to rotate the torsion beam portions 3 as a rotation axis, thereby oscillating the mirror portion 2. In this case, the motor is attached to an end of the torsion beam portions 3, so that the optical scanner is enlarged. In other words, such a structure is not preferable. However, since the optical scanner 1 of this illustrative embodiment includes the base plate portion 6 made of stainless steel and the like and the reinforcement portion 7 made of sapphire, alumina, silicon carbide, diamond or the like, it is possible to highly reduce the distortion of the reflective surface 8 and to perform a high precision scanning of the light without damaging the connections between the base plate portion 6 and the torsion beam portions 3 when the mirror portion 2 is oscillated, without causing the problem such as size increase of the optical scanner 1.

[Example of Application of Optical Scanner]

Figure 10:
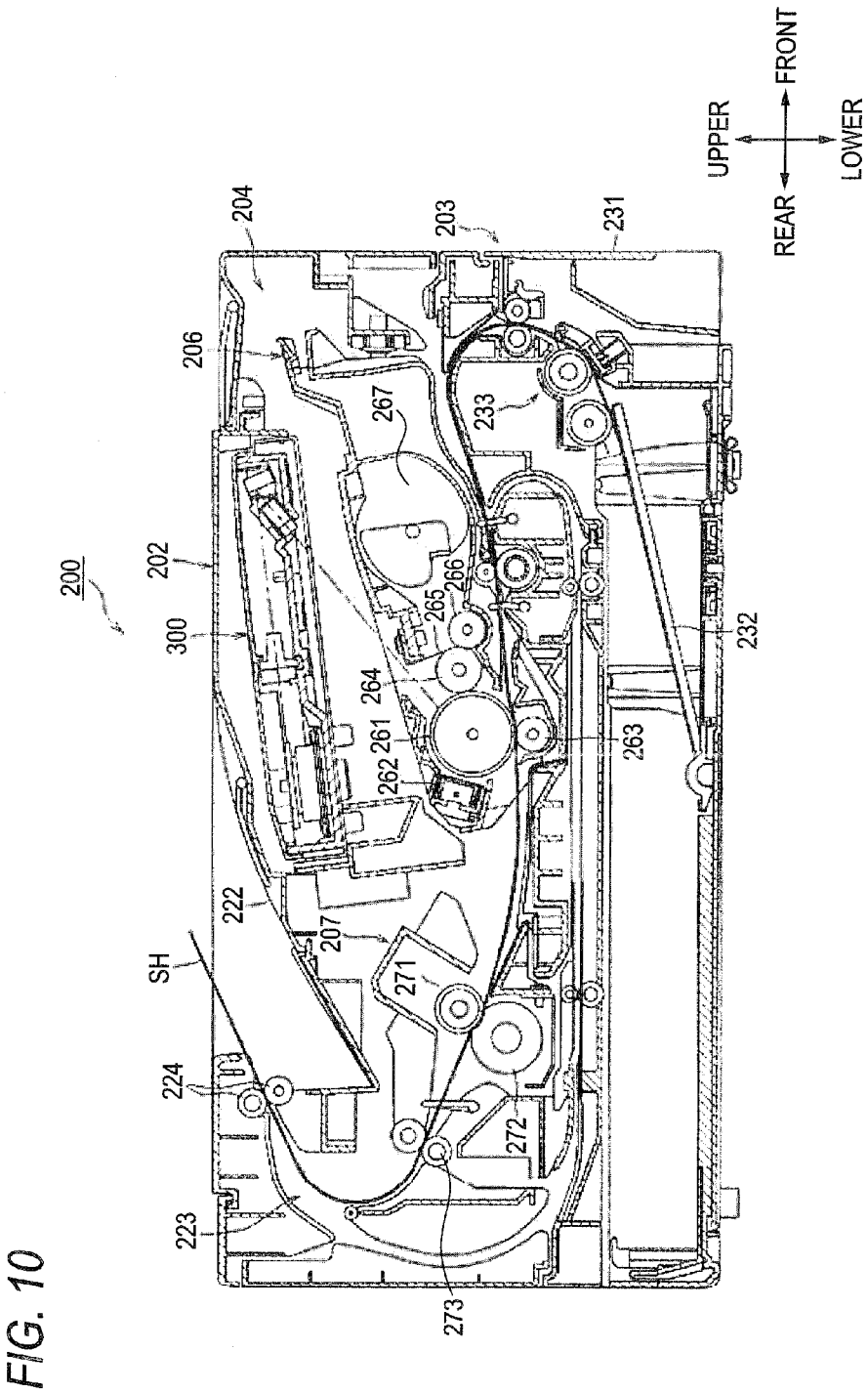
FIG. 10 is a cross-section view showing a configuration of a laser printer 200 including the optical scanner 1.
Figure 11:
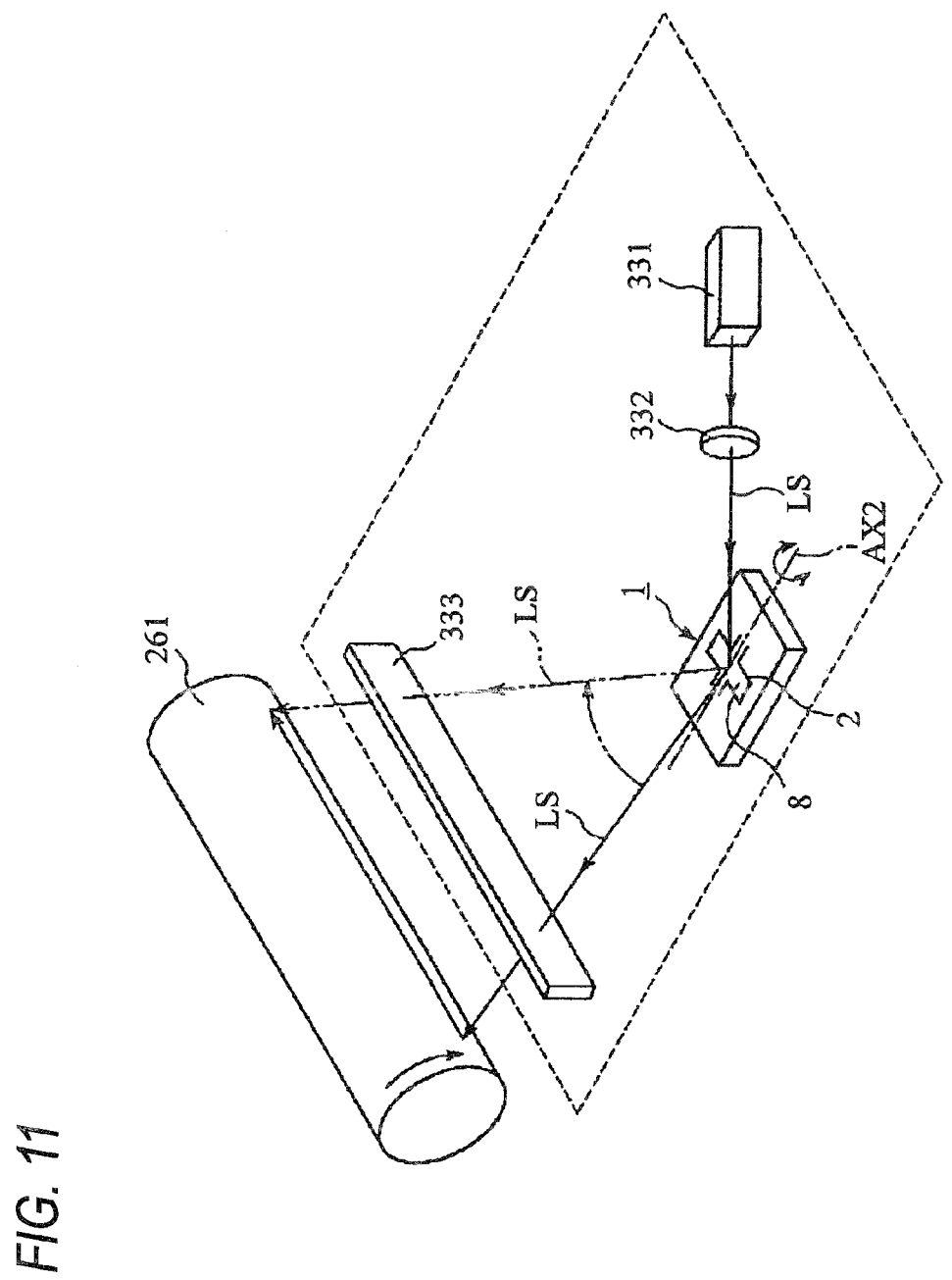
FIG. 11 is an exposure unit 300 that exposes a surface of a photosensitive drum 261 in the laser printer 200.

Hereinafter, a laser printer 200 including the optical scanner 1 of the above-described illustrative embodiment will be described with reference to FIG. 10 and FIG. 11. As shown in FIG. 10, the laser print 200 includes a body casing 202, a sheet feed portion 203, an image forming portion 204, a conveying roller 273, a conveying path 223 and a sheet discharge tray 222. In the following description, a right side and a left side of FIG. 10 are defined as a front and a rear, a front surface side and a back surface side thereof are defined as a left and right, and an upper-lower side thereof is defined as an upper-lower direction.

The sheet feed portion 203 is provided at a lower part in the body casing 202. The sheet feed portion 203 includes a sheet feed tray 231, a sheet pressing plate 232 and a sheet feeding mechanism 233. Sheets SH stored in the sheet feed tray 231 is raised by the sheet pressing plate 232. The sheets SH raised by the sheet pressing plate 232 are supplied to the image forming portion 204 by the sheet feeding mechanism 233.

The image forming portion 204 includes an exposure portion 300, a process cartridge 206 and a fixing device 207.

The exposure portion 300 is provided at an upper part in the body casing 202. The exposure portion 300 emits a laser light based on an image data. The exposure portion 300 exposes the surface of a photosensitive drum 261 to form an electrostatic latent image. The detailed configuration of the exposure portion 300 will be described later with reference to FIG. 11.

The process cartridge 206 is provided at a lower part of the exposure portion 300. The process cartridge 206 includes the photosensitive drum 261, a charger 262, a transfer roller 263, a developing roller 264 and a thickness regulating blade 265, and a supply roller 266 and a toner container 267.

The charger 262 charges the surface of the photosensitive drum 261 uniformly. After being charged, the surface of the photosensitive drum 261 is exposed by laser light from the exposure portion 300. According to this exposure, an electrostatic latent image based on an image data is formed on the photosensitive drum 261. Toner in the toner container 267 is supplied onto the developing roller 264 via the supply roller 266. The toner supplied onto the developing roller 264 enters between the developing roller 264 and the thickness regulating blade 265 and held on the developing roller 264 as a thin layer with a constant thickness.

The toner held on the developing roller 264 is supplied onto the electrostatic latent image formed on the photosensitive drum 261. According to this toner supply, the electrostatic latent image is visualized. In other words, a toner image is formed on the photosensitive drum 261. Then, a sheet SH passes between the photosensitive drum 261 and the transfer roller 263 so that the toner image is transferred onto the sheet SH.

The fixing device 207 is provided at a rear side of the process cartridge 206. The fixing device 207 includes a heating roller 271 and a pressing roller 272. The pressing roller 272 is provided to oppose and press the heating roller 271. The fixing device 207 heat-fixes the toner image on the sheet SH when the sheet SH is passing between the heating roller 271 and the pressing roller 272.

The sheet SH with the toner image being fixed is conveyed along the conveying path 223 and discharged onto the sheet discharge tray 222 by the discharge roller 224 from the conveying path 223.

The detailed configuration of the exposure portion 300 will be described with reference to FIG. 11. The exposure portion 300 includes the optical scanner 1 according to the above-described illustrative embodiment, a laser light source 331, a collimate lens 332 and an fθ lens 333. In the following description, the downstream side with respect to a laser light proceeding direction from the laser light source 331 is referred to as a downstream side.

The laser light source 331 emits a laser light LS toward the mirror portion 2 of the optical scanner 1 based on an image data. The collimate lens 332 collects the laser light from the light source 331 and converts it into a parallel light flux. The fθ lens 333 focuses the laser light scanned by the optical scanner 1 on the surface of the photosensitive drum 261. The fθ lens 333 has a function of causing the laser light to be scanned on the surface of the photosensitive drum 261 by a constant speed.

The laser light LS emitted from the laser light source 331 reaches the optical scanner 1 though the collimate lens 332. Then, the laser light LS reflected by the optical scanner 1 reaches the surface of the photosensitive drum 261 through the fθ lens 333. The laser light LS reflected by the mirror portion 2 of the optical scanner 1 is main-scanned in an arrow direction shown in FIG. 11 according to the oscillation of the mirror portion 2. Further, the laser light LS is sub-scanned in a peripheral direction of the photosensitive drum 261 according to the rotation of the photosensitive drum 261. The surface of the photosensitive drum 261 is exposed by this scanning of the laser light LS. Accordingly, an electrostatic latent image is formed on the photosensitive drum 261 based on an image data. Since the optical scanner 1 of the above-described illustrative embodiment is used in the laser printer 200, it is possible to perform a high precision scanning and to form a high quality image.

Figure 12:
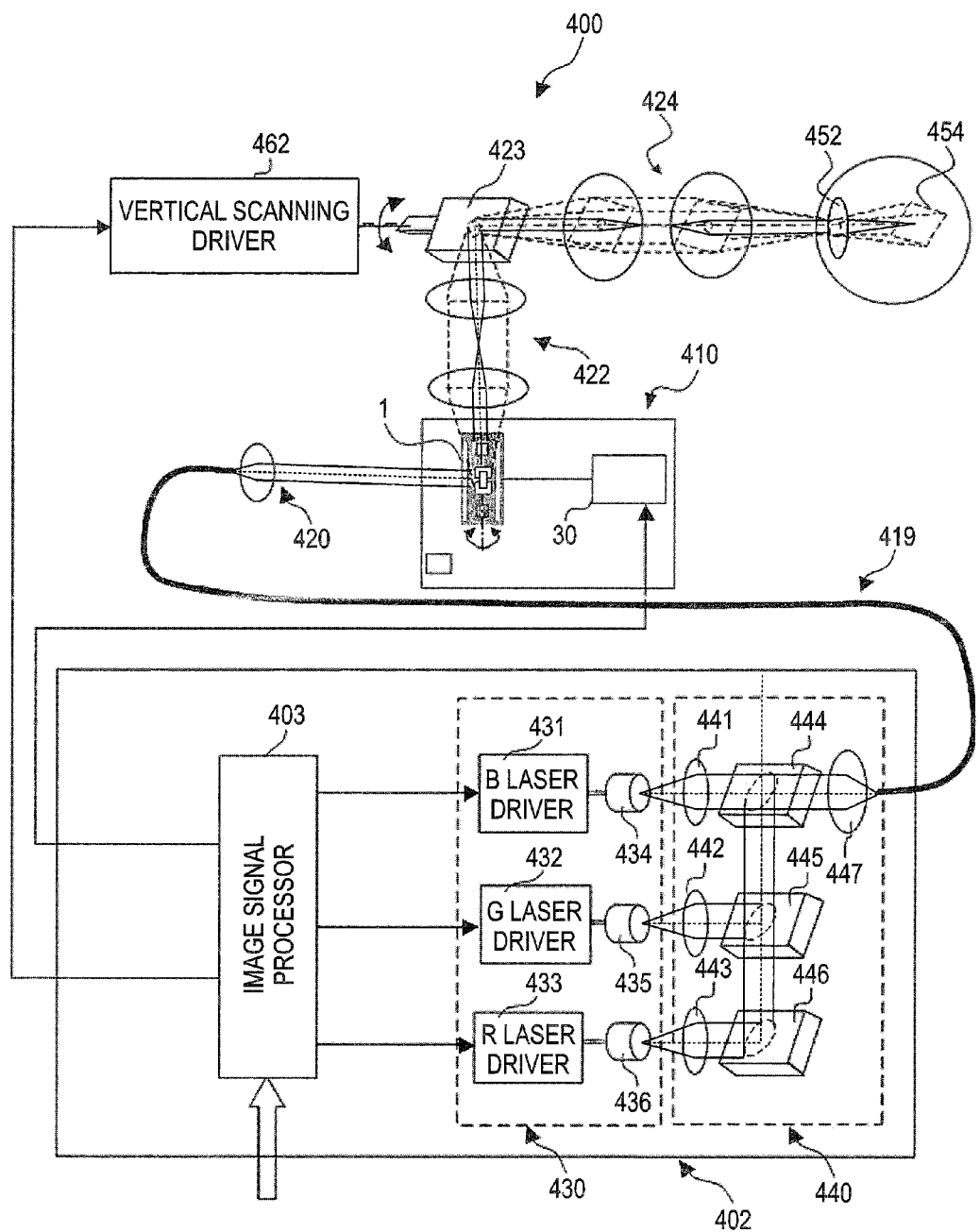
FIG. 12 is a schematic view showing a configuration of an image display apparatus 400.

Next, an image display apparatus 400 including the optical scanner 1 of the above-described illustrative embodiment will be described with reference to FIG. 12. The image display apparatus 400 shown in FIG. 12 is an apparatus that projects an image on a retina 454 of an observer with the light incident on a pupil 452, thereby allowing the observer to see a virtual image. This apparatus is also called as a retinal image display.

The image display apparatus 400 includes a light generator 402, an optical fiber 419, a collimate optical system 420, the optical scanner 1 according to the above-described illustrative embodiment, a first replay optical system 422, a vertical scanner 423 and a second relay optical system 424. The light generator 402 includes an image signal processor 403, a laser light source 430 and an optical multiplexer 440. The image signal processor 403 generates a B signal, a G signal, an R signal, a horizontal synchronizing signal and a vertical synchronizing signal, which are elements for composing images based on image signals supplied from the outside.

The laser light source 430 includes a B laser driver 431, a G laser driver 432, an R laser driver 433, a B laser 434, a G laser 435 and an R laser 436. The B laser driver 431 drives the B laser 434 so as to generate blue light having an intensity in accordance with a B signal from the image signal processor 403. The G laser driver 432 drives the G laser 435 so as to generate green light having an intensity in accordance with a G signal from the image signal processor 403. The R laser driver 433 drives the R laser 436 so as to generate red light having an intensity in accordance with an R signal from the image signal processor 403. The B laser 434, the G laser 435 and the R laser 436 may be configured by a semiconductor laser or a solid laser having harmonic producer.

The optical multiplexer 440 includes collimate optical systems 441, 442, 443 that collimate the laser light, dichroic mirrors 444, 455, 456 that multiplex the collimated laser light and a collecting optical system 447 that guides the multiplexed laser light to the optical fiber 419. The blue laser light emitted from the B laser 434 is collimated by the collimate optical system 441 and then incident onto the dichroic mirror 444. The green laser light emitted from the G laser 435 is collimated by the collimate optical system 442 and then incident onto the dichroic mirror 445. The red laser light emitted from the R laser 436 is collimated by the collimate optical system 443 and then incident onto the dichroic mirror 446. The laser lights of three primary colors, which are respectively incident onto the dichroic mirrors 444, 445, 446 are reflected or transmitted in a wavelength selection manner and multiplexed into light that is then incident onto the collecting optical system 447. The multiplexed laser light is collected by the collecting optical system 447 and then incident to the optical fiber 419.

The optical scanner 1 is driven in accordance with a control signal from the image signal processor 403. A vertical scanning driver 462 drives the vertical scanner 423 in accordance with a control signal from the image signal processor 403. The laser light is converted into a light horizontally and vertically scanned and then allowed to be projected as an image by the scanning of the optical scanner 1 and the scanning of the vertical scanner 423. Specifically, the laser light emitted from the optical fiber 419 is collimated by the collimate optical system 420 and then guided to the mirror portion 2 of the optical scanner 1. The laser light that is horizontally scanned by the mirror portion 2 passes through the first relay optical system 422 and is then incident on the vertical scanner 423 as parallel light. At this time, an optical pupil is formed at the position of the vertical scanner 423 by the first reply optical system 422. The laser light that is vertically scanned by the vertical scanner 423 passes though the second relay optical system 424 and is then incident on the pupil 452 of the observer as parallel light. Herein, the pupil 452 of the observer and the optical pupil at the position of the vertical scanner 423 have a conjugate relation by the second relay optical system 424. Since the optical scanner 1 of the above-described illustrative embodiment is used in the image display apparatus 400, it is possible to perform a high precision scanning and to form a high quality image.

[Advantageous Effects of Illustrative Embodiments]

According to the optical scanner 1 of the above-described illustrative embodiment, the reflective surface 8 that reflects the incident light is provided on the front surface FR of the reinforcement portion 7 having a Young's modulus E2 greater than a Young's modulus E1 of the base plate portion 6. Therefore, compared to the case where a mirror portion does not have a reinforcement portion and a reflective surface is directly formed on the surface of a base plate portion, it is possible to reduce the dynamic distortion of the mirror portion 2 when the mirror portion 2 is oscillated. In addition, as the dynamic distortion of the mirror portion 2 is reduced, the dynamic distortion of the reflective surface 8 of the mirror portion 2 can be reduced. Additionally, since the density $\rho 2$ of the reinforcement portion 7 is lower than the density $\rho 1$ of the base plate portion 6, it is possible to suppress the mass increase of the entire mirror portion 2 which is caused by providing the reflective portion including the reinforcement portion 7 and the reflective surface 8 on the front surface FB of the base plate portion 6. Accordingly, an influence on the oscillation of the mirror portion 2 is less. Accordingly, since it is possible to highly suppress the dynamic distortion of the reflective surface 8 of the mirror portion 2 when the mirror portion 2 is largely oscillated, it is possible to perform a high precision scanning.

In a case where the reflective surface is formed on one of the surfaces of the base plate portion, and the reinforcement portion is adhered to an opposite surface of the base plate portion to the surface on which the reflective surface is provided, the static distortion is generated on the one surface of the base plate portion on which the reflective surface is provided when adhering the reinforcement portion to the base plate portion. This is because the reinforcement portion has the Young's modulus E2 greater than the Young's modulus E1 of the base plate portion. Accordingly, as the static distortion is generated on the surface of the base plate portion on which the reflective surface is provided, the static distortion is also generated on the reflective surface.

According to the optical scanner 1 of the above-described illustrative embodiment, the reflective portion including the reinforcement portion 7 and the reflective surface 8 is adhered to the front surface FB of the base plate portion 6. Thereby, the static distortion, which is caused by the adhesion between the reflective portion including the reinforcement portion 7 and the base plate portion 6, is not generated on the front surface FR of the reinforcement portion 7 on which the reflective surface 8 is provided but generated on the back surface UB opposite to the front surface FB of the base plate portion 6. Thereby, it is possible to suppress the static distortion which is generated on the reflective surface 8 when the reflective portion is adhered to the base plate portion 6 as well as to suppress the dynamic distortion of the reflective surface 8 of the mirror portion 2, which is caused when the mirror portion 2 is largely oscillated. Accordingly, it is possible to reduce the distortions of the reflective surface 8 of the mirror portion 2, thereby performing a high precision scanning.

According to the optical scanner 1 of the above-described illustrative embodiment, the reflective surface 8 that reflects the incident lights has the density $\rho 2$ lower than the density $\rho 1$ of the base plate portion 6 and is provided on the front surface FR of the reinforcement portion 7 having the Young's modulus E2 greater than the Young's modulus E1 of the base plate portion 6 and the back surface UR of the reinforcement portion 7 is adhered to the front surface FB of the base plate portion 6. Accordingly, it is possible to reduce the dynamic distortion of the reflective surface 8 of the mirror portion 2, which is caused when the mirror portion 2 is oscillated.

According to the optical scanner 1 of the above-described illustrative embodiment, the back surface UR of the reinforcement portion 7 made of the material having a ratio $\rho 2/E2$ of $1.0 \times 10^{-8} (s^2 m^{-2})$ or less is adhered to the front surface FB of the base plate portion 6. Accordingly, it is possible to reduce the dynamic distortion of the reflective surface 8 of the mirror portion 2, which is caused when the mirror portion 2 is oscillated. Thereby, it is possible to suppress the dynamic distortion of the reflective surface 8 of the mirror portion 2, which is caused when the mirror portion 2 is largely oscillated, so that a high precision scanning can be performed.

According to the optical scanner 1 of the above-described illustrative embodiment, the back surface UR of the reinforcement portion 7 made of any one of alumina, sapphire, ruby, silicon carbide and diamond is adhered to the front surface FB of the base plate portion 6. Thus, it is possible to reduce the dynamic distortion of the reflective surface 8 of the mirror portion 2, which is caused when the mirror portion 2 is oscillated. Thereby, it is possible to suppress the dynamic distortion of the reflective surface 8 of the mirror portion 2, which is caused when the mirror portion 2 is largely oscillated, so that a high precision scanning can be performed.

According to the optical scanner 1 of the above-described illustrative embodiment, the thickness of the reinforcement portion 7 in a direction perpendicular to the reflective surface 8 is five times or less greater than that of the base plate portion 6. Thus, it is possible to reduce the dynamic distortion of the reflective surface 8 of the mirror portion 2 without enlarging the mirror portion 2 and it is possible to perform a high precision scanning.

According to the optical scanner 1 of the above-described illustrative embodiment, the torsion beam portions 3 are connected to both sides of the base plate portion 6. Thus, when the optical scanner 1 is driven, a possibility that an inherent mode different from the torsional vibrations such as bending will be generated on the torsion beam portions 3 is reduced. Accordingly, since the torsion beam portions 3 can obtain the stable torsional vibrations, it is possible to perform a high precision scanning.

(Modified Illustrative Embodiments)

While the present invention has been shown and described with reference to certain exemplary embodiments thereof, it will be understood by those skilled in the art that various changes in form and details may be made therein without departing from the spirit and scope of the invention as defined by the appended claims.

Figure 8:
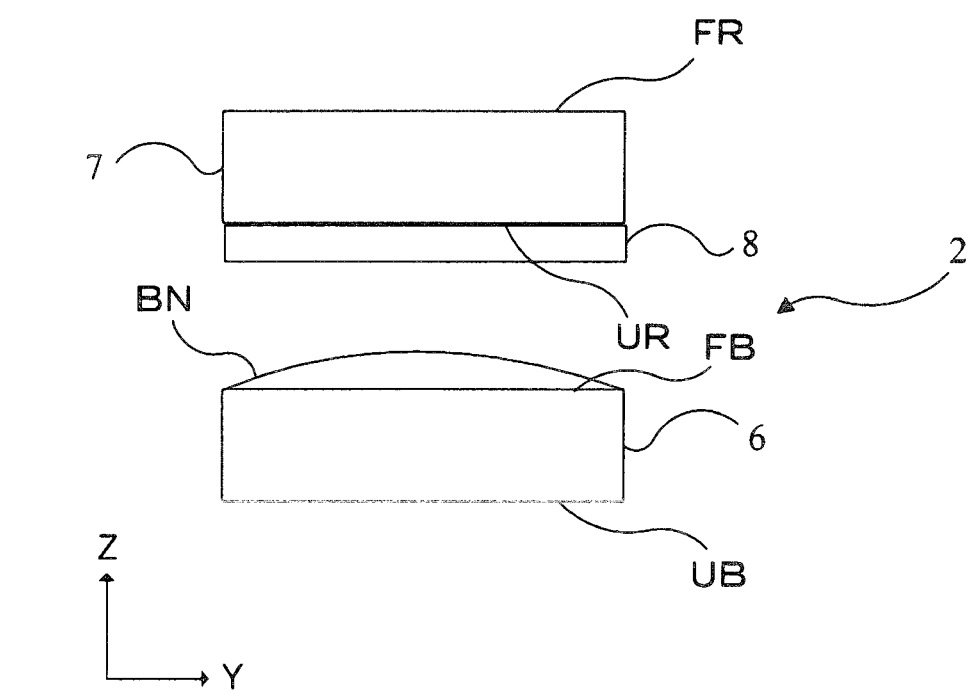
FIG. 8 is a side view showing a modified illustrative embodiment of the mirror portion 2 of the optical scanner 1.
Figure 9:
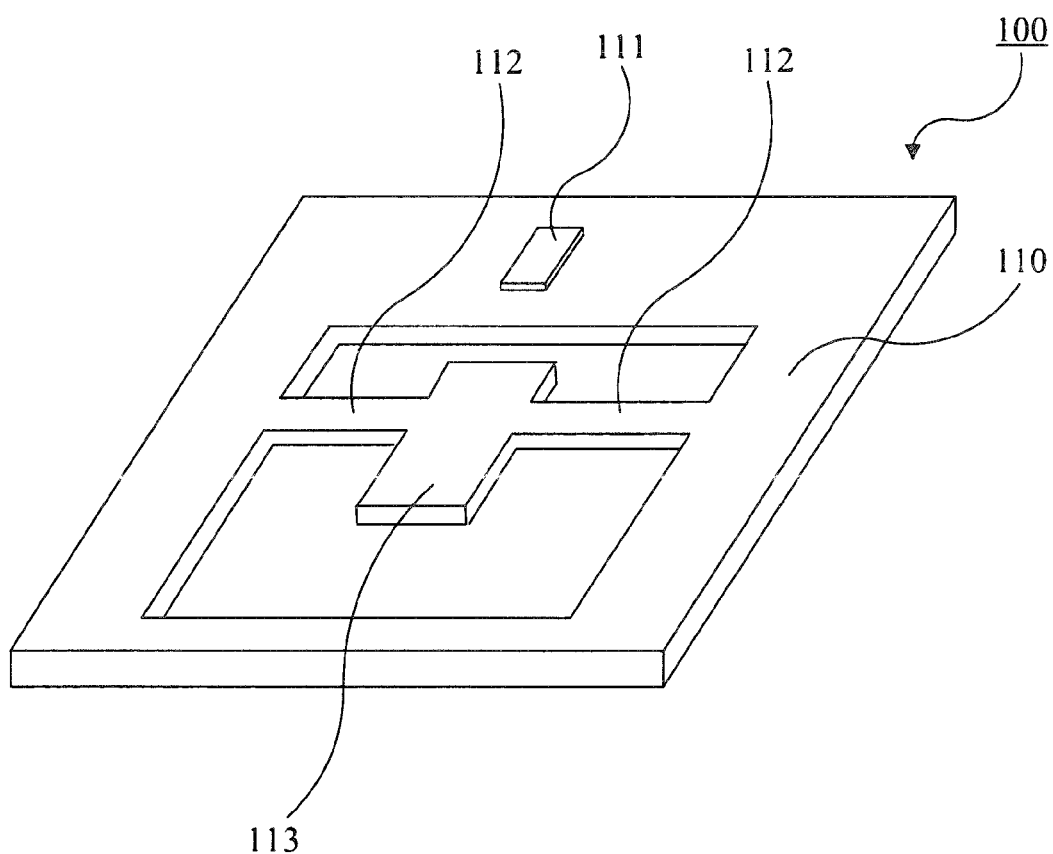
FIG. 9 is a perspective view showing a related-art optical scanner.

In the above-described illustrative embodiment, the back surface UR of the reinforcement portion 7 is adhered to the front surface FB of the base plate portion 6 and the reflective surface 8 is formed on the front surface FR of the reinforcement portion 7, thereby forming the mirror portion 2. However, the present invention is not limited thereto. For example, as shown in FIG. 8, the reflective surface 8 may be formed on the back surface UR of the reinforcement portion 7 and then adhered to the front surface FB of the base plate portion 6, thereby forming the mirror portion 2. In this case, since it is necessary for the reinforcement portion 7 to have a physical property of transmitting the light, it is required to use the material having transmissivity, a low density and a high Young's modulus such as sapphire, ruby and diamond for the reinforcement portion 7. In this case, the optical scanner 1 reflects and scans the lights, which are incident on and penetrate the reinforcement portion 7 and then are incident on the reflective surface 8. In this case as well, the dynamic and static distortions generated on the reflective surface 8 are reduced like the dynamic and static distortions in the above-described illustrative embodiment, so that the optical scanner 1 can perform a high precision scanning. In addition, since the reflective surface 8 is provided between the base plate portion 6 and the reinforcement portion 7, the reflective surface 8 is protected. Accordingly, it is possible to prevent the reflective surface 8 from being deformed due to the external temperatures or shocks, so that it is possible to perform a high precision scanning.

In the above-described illustrative embodiment, as the material for the reinforcement portion 7, any one of sapphire, alumina, silicon carbide and diamond is used. However, the present invention is not limited thereto. In other words, a material having a greater Young's modulus and a lower density than those of the material of the base plate portion 6 may be used. For example, ruby may be used as the reinforcement portion 7. However, sapphire and alumina are preferable as the material of the reinforcement portion 7, which have physical properties necessary for the material of the reinforcement portion 7 is easily available. Sapphire having a small surface roughness is more preferable.

In the above-described illustrative embodiment, LOCTITE 392+7923 is used as the adhesive BN. The LOCTITE 392+7923 is preferable as an adhesive that adheres the reinforcement portion, the base plate portion and the reflective surface since it has impact-resistance and heating-cooling cycle properties and can be adhered at room temperatures. However, the present invention is not limited thereto. For example, epoxy resin-based adhesives may be used. As the method of providing the reinforcement portion 7 and the reflective surface 8 on the base plate portion 6, a method of using diffusion adhesion without using the adhesive is conceivable. However, when the diffusion adhesion is used, high heat and pressure are required. Therefore, the physical properties or shapes of the base plate portion 6, the reinforcement portion 7 and the reflective surface 8 may be changed. Thus, the diffusion adhesion is not preferable.

In the above-described illustrative embodiment, the etching is used in the process of SA2 of integrally forming the torsion beam portions 3, the oscillation plate 4a, the fixing frame 4b and the base plate portion 6. However, the present invention is not limited thereto. For example, a press working, an electrical discharge machining and the like may be used. In addition, in the above-described illustrative embodiment, the aerosol deposition method is used in the process of SB2 of forming and providing the piezoelectric elements 11L, 11R. However, the present invention is not limited thereto. For example, a vacuum deposition, a physical vapor deposition, a chemical vapor deposition and the like may be used. Additionally, instead of the piezoelectric elements formed and provided by the aerosol deposition method and the like, bulk piezoelectric elements may be used for the piezoelectric elements 11L, 11R. Further, in the above-described illustrative embodiment, the vacuum deposition is used in the process of SC2 of forming the upper electrodes 12L, 12R. However, the present invention is not limited thereto. For example, a physical vapor deposition, a chemical vapor deposition and the like may be used.

In addition, a structure of the optical scanner is not limited to the structure of the optical scanner 1 according to the above-described illustrative embodiment. For example, any structure may be used as long as the optical scanner has the mirror portion that reflects the incident lights and the torsion beam portions that are connected to the mirror portion. For example, as disclosed in JP-A-2004-191953, a structure having a mirror portion and a bifurcated torsion beam portion connected to both sides of the mirror portion may be used.

In the above-described illustrative embodiment, the whole back surface UR of the reinforcement portion 7 is adhered to the whole front surface FB of the base plate portion 6. However, the present invention is not limited thereto. For example, the back surface UR of the reinforcement portion 7 may be adhered to a part of the front surface FB of the base plate portion 6. Alternatively, it may be possible that a layer is specially provided on the front surface FB of the base plate portion 6 and the back surface UR of the reinforcement portion 7 is adhered to the layer on the front surface FB. Further, in the above-described illustrative embodiment, the adhesive BN is applied to the back surface UR of the reinforcement portion 7 and the back surface UR of the reinforcement portion 7 is adhered to the front surface FB of the base plate portion 6. However, the present invention is not limited thereto. For example, it may be possible that the adhesive BN is applied to the front surface FB of the base plate portion 6 and the back surface UR of the reinforcement portion 7 is adhered to the front surface FB of the base plate portion 6.

What is claimed is:

1. An optical scanner comprising:
   a mirror portion including:
      a base plate portion; and
      a reflective portion which is adhered to a first surface which is one of a front surface and a back surface of the base plate portion, and which is configured to reflect an incident light; and
   a torsion beam portion which is connected to the mirror portion, made of a same material as the base plate portion and integrally formed with the base plate portion, and which is configured to be torsionally vibrated,
   wherein the reflective portion includes a reinforcement portion and a reflective surface,
   wherein the reinforcement portion is made of material having a density $\rho 2$ lower than a density $\rho 1$ of the base plate portion and a Young's modulus $E2$ greater than a Young's modulus $E1$ of the base plate portion,
   wherein the reflective surface is formed on a second surface which is one of a front surface and a back surface of the reinforcement portion, and is configured to reflect the incident light,
   wherein a third surface which is one of the front surface and the back surface of the reinforcement portion and is opposite to the second surface is adhered to the first surface of the base plate portion, and
   wherein the reinforcement portion is made of material having a ratio $\rho 2/E2$ of $1.0 \times 10^{-8}$ ($s^2 m^2$) or less.

2. The optical scanner according to claim 1, wherein the reinforcement portion is made of any one of alumina, sapphire, ruby, silicon carbide and diamond.

3. The optical scanner according to claim 1,
   wherein the torsion beam portion is connected to both sides of the base plate portion.

4. An image forming apparatus comprising:
   the optical scanner according to claim 1;
   a light source which is configured to emit light to the optical scanner; and
   an image forming portion which is configured to form an image based on a light scanned by the optical scanner.

5. An image display apparatus comprising:
   the optical scanner according to claim 1;
   a light source which is configured to emit light to the optical scanner; and
   an optical system which is configured to guide a light scanned by the optical scanner to an eye of a user.

6. An optical scanner comprising:
   a mirror portion including:
      a base plate portion; and
      a reflective portion which is adhered to a first surface which is one of a front surface and a back surface of the base plate portion, and which is configured to reflect an incident light; and
   a torsion beam portion which is connected to the mirror portion, made of a same material as the base plate portion and integrally formed with the base plate portion, and which is configured to be torsionally vibrated,
   wherein the reflective portion includes a reinforcement portion and a reflective surface,
   wherein the reinforcement portion is made of material having a density $\rho 2$ lower than a density $\rho 1$ of the base plate portion and a Young's modulus $E2$ greater than a Young's modulus $E1$ of the base plate portion,
   wherein the reflective surface is formed on a second surface which is one of a front surface and a back surface of the reinforcement portion, and is configured to reflect the incident light,
   wherein a third surface which is one of the front surface and the back surface of the reinforcement portion and is opposite to the second surface is adhered to the first surface of the base plate portion, and
   wherein a thickness of the reinforcement portion in a direction perpendicular to the reflective surface is five times or less greater than that of the base plate portion.

7. The optical scanner according to claim 6,
   wherein the reinforcement portion is made of any one of alumina, sapphire, ruby, silicon carbide and diamond.

8. An optical scanner comprising:
   a mirror portion including:
      a base plate portion; and
      a reflective portion which is adhered to a first surface which is one of a front surface and a back surface of the base plate portion, and which is configured to reflect an incident light; and
   a torsion beam portion which is connected to the mirror portion, made of a same material as the base plate portion and integrally formed with the base plate portion, and which is configured to be torsionally vibrated,
   wherein the reflective portion includes a reinforcement portion and a reflective surface,
   wherein the reinforcement portion is made of material having a density $\rho 2$ lower than a density $\rho 1$ of the base plate portion and a Young's modulus $E2$ greater than a Young's modulus $E1$ of the base plate portion,
   wherein the reflective surface is formed on a second surface which is one of a front surface and a back surface of the reinforcement portion, and is configured to reflect the incident light,
   wherein the reflective surface is adhered to the first surface of the base plate portion, and
   wherein the reinforcement portion is made of light transmissive material.

9. The optical scanner according to claim 8,
   wherein the reinforcement portion is made of material having a ratio $\rho 2/E2$ of $1.0 \times 10^{-8}$ ($s^2 m^{-2}$) or less.

10. The optical scanner according to claim 9,
    wherein the reinforcement portion is made of any one of sapphire, ruby and diamond.

11. The optical scanner according to claim 8,
    wherein the reinforcement portion is made of any one of sapphire, ruby and diamond.

12. The optical scanner according to claim 8,
    wherein a thickness of the reinforcement portion in a direction perpendicular to the reflective surface is five times or less greater than that of the base plate portion.

13. The optical scanner according to claim 8,
    wherein the torsion beam portion is connected to both sides of the base plate portion.

* * * * *